United States Patent Office 3,332,612
Patented July 25, 1967

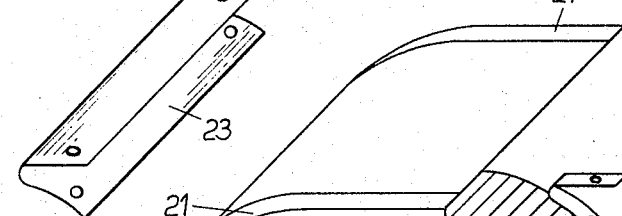
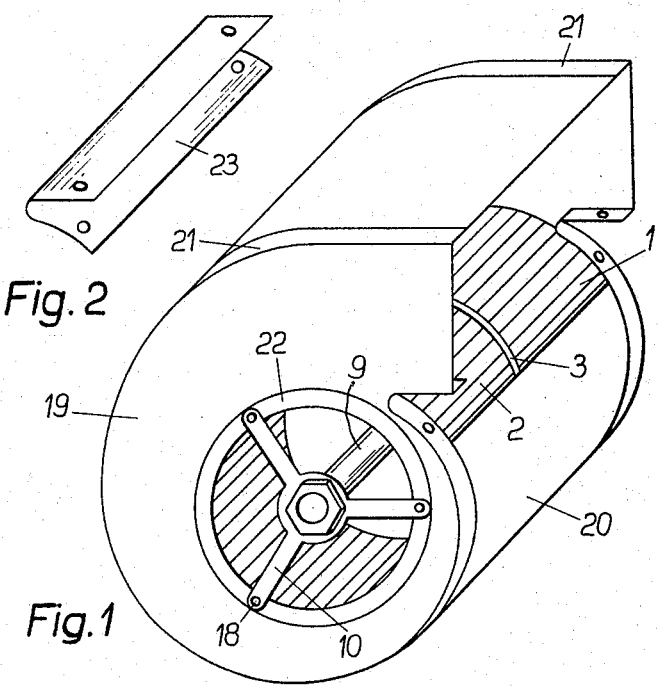
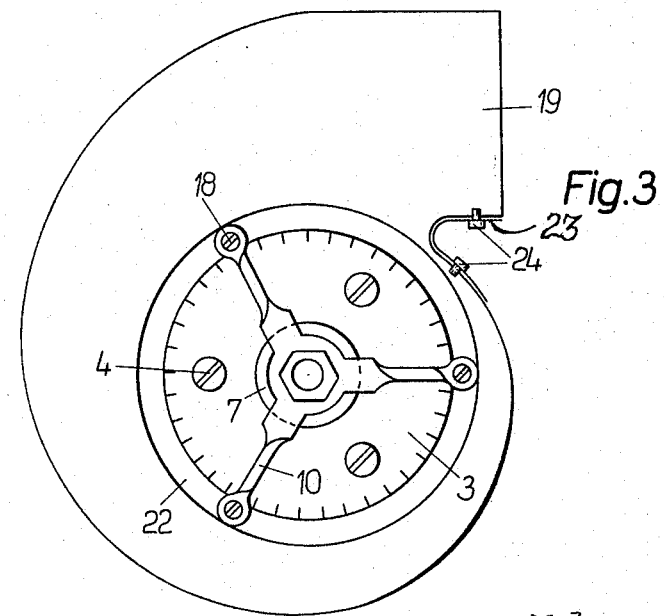

3,332,612
RADIAL FLOW BLOWER
Johann Gross, Andernach, Germany, assignor to Bleck- und Metallwarenfabrik Robert Fischbach KG, Neunkirchen Kreis Siegen, Germany
Filed Nov. 16, 1965, Ser. No. 508,023
4 Claims. (Cl. 230—117)

ABSTRACT OF THE DISCLOSURE

A radial flow blower having a spiral-shaped casing and a drum type impeller in the casing and an electrically-driven driving motor mounted in the impeller and having a stator and disk-shaped rotor connected to drive the impeller with a carrying plate is secured in the impeller to which the motor is secured. The motor drives the carrying plate which latter in turn drives the impeller.

---

Figure 4:
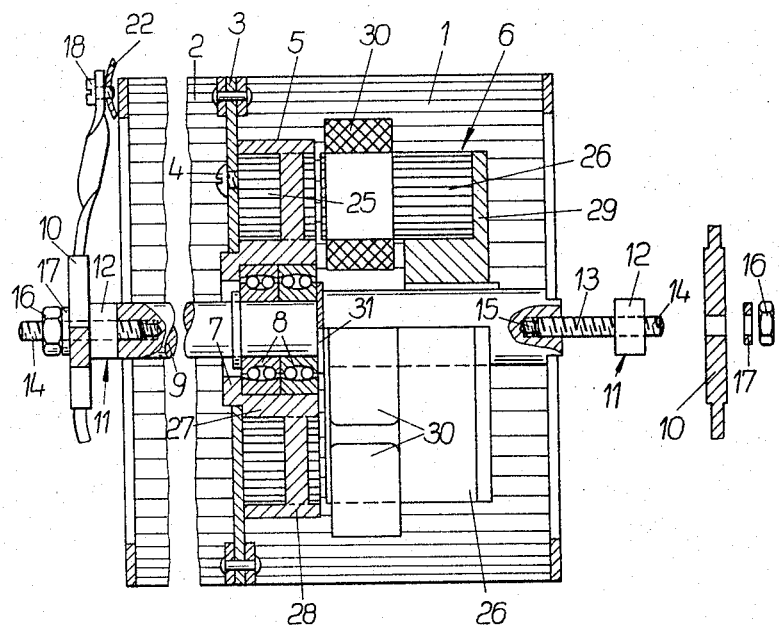

This invention relates to a radial flow blower comprising a rotor of drum type, having a ring-like rotor with a multiplicity of blades whereof the radial length is small compared to their axial dimension. The invention relates to blowers of the kind referred to, wherein the driving motor is located within the drum rotor and is fastened on a spirally shaped blower casing.

The invention has as its object the improvement and simplification of the blowers referred to. According to the invention, the radial flow blower comprising a drum rotor and an electric driving motor mounted therein, is arranged in such manner that the drum rotor is driven by means of a so-called "disk-type" motor, with the drum rotor secured to the rotor of the motor by means of a bearing, and the rotor of the motor itself is mounted rotatably on a stationary spindle traversing the stator and supported at both extremities.

Several advantages are obtained simultaneously by the inventive construction of the blower. The overhung mounting of the motor customary hitherto, which easily gave rise to oscillations and knocking or chatter of the drum rotor, is eliminated. The direct fastening of the drum rotor or impeller on the rotor of the motor furthermore offers the advantage that the drum impeller need not as hitherto be made with a hub for placing on the motor spindle, and be balanced with this hub. Its mounting, preferably being a bearing or carrying disc or plate, may be fastened directly to the rotating rotor disc by means of screws with relatively high tolerances, and its fitting may be facilitated by centering rim secured on the rotor disc. This eliminates the danger of imbalance, which is relatively high in drum impellers comprising a hub, quite apart from the fact that expenditure of labor for the hub manufacture is saved. Balancing itself may be performed in a simple manner by balancing the stationary spindle together with the motor and drum impeller, the stationary spindle being clamped or chucked in the balancing machine.

Several other advantages accrue for radial flow blowers from the application of a disk-type motor. The disk-type motor has a very short length axially, so that the intake cross-section is reduced but little by the fitting of the motor into the drum impeller. The structural length becomes particularly short if the motor of the motor is mounted directly on the stationary spindle with insertion of two ball bearings, that is without axially projecting bosses increasing the structural length of the motor.

The application of a stationary spindle which is secured to both extremities of the impeller, moreover provides the opportunity for mounting in very noise-damping relationship, if according to a further modification of the invention, the spindle is secured to the elements carrying the same, such as "spiders" as a rule by means of rubber-metal units known per se. Besides noise-damping, this form of fastening has the advantage that damage caused by knocks during transport is largely eliminated.

The application of a stationary spindle fastened at both ends may according to the invention, also be exploited to simplify the blower casing. In known radial flow blowers, the diameter of the suction or intake aperture must be of greater size in at least one end side than the outer diameter of the drum impeller, so that the latter may be inserted in the casing, and additional so-called air ingress rings are required for guiding air to the suction aperture, which cover the blade ring of the drum impeller. According to the invention, the casing is made from a spirally bent plate or sheet and from two end plates which are also formed spirally and have circular portions cut out to serve as suction apertures, so that the diameter of the suction apertures of the end sides is smaller than the outer diameter of the drum impeller. The edges of the suction orifices themselves each form an ingress ring and the lower part of the outflow aperture of the casing and the adjacent part of the periphery of the casing is covered by a sheet metal lip or the like, which is removably joined to the casing. This construction of the blower casing eliminates the need for special ingress rings. The insertion of the drum impeller, together with the spindle and motor, is carried out through the outflow aperture with the sheet metal lip removed, which latter may, after insertion of the motor, be replaced and secured to the casing by screws. This lip at the same time facilitates production of the casing, specifically welding the end sides with the spirally bent envelope plate of the casing.

Further objects of the invention will be apparent from the following description when considered in connection with the accompanying drawings, in which:

FIGURE 1 is a perspective view of a radial flow blower with a drum impeller and casing, FIG. 2 is a perspective view of a removable part of the casing, FIG. 3 shows an end elevation of the blower and case, and FIG. 4 is a longitudinal section through the drum impeller and disk-type motor, the lower half of the stator of the motor being shown in side elevation.

FIG. 1 shows a drum type impeller comprising two identical blade or vane rings 1 and 2. The two impeller portions are fastened to a carrying plate 3 in the form of an annular sheet metal plate in the middle of the drum impeller. As shown in FIG. 3, the carrying plate 3 of the impeller is secured by means of three screws 4, to the disk-shaped rotor 5 of a disk-type armature motor, whose stator is indicated at 6. For lightening and complementary centering of the impeller 1, the rotor 5 has secured thereon a centering rim 7. Within its axial extension, the rotor 5 is rotatably mounted with intercalation of two ball bearings 8 on a stationary spindle 9, which traverses the drum impeller as well as the stator 6 and is fastened to spiders 10 at both extremities of the impeller. For its fastening, rubber-metal units 11 are employed, which consist of two screwbolts 13 and 14 embedded in a rubber block 12. The bolt 13 is screwed into a tapped bore 15 in the spindle 9. On the threaded stub 14 there is secured a spider 10, a nut 16 and washer 17 for fastening the parts together. The rubber unit 11 may also contain a metal unit having a tapped bore and a threaded pin, or two tapped bores, the spider 10 being fastened by means of a screwbolt as in the first case, and the spindle 9 mandatorily also having a threaded pin or stud in the second modification.

The spiders 10 themselves are fastened by screws 18 to the end sides 19 of the blower casing. The latter comprises a spirally bent plate 20, and two end plates 19 which are equally of spiral form and have flanged-over edges joined to the plate 20 by spot welding. An annular roll or flange 22 is pressed outwards from each end side 19, FIG. 1, which acts as an ingress ring for the air drawn in. The open diameter of the ring is smaller than the outer diameter of the drum impeller, so that the latter may be inserted into the casing. The spirally shaped plate 20 terminates before the outflow aperture of the blower, and for partial covering of this aperture and of the part of the impeller periphery not covered by the plate 20, a sheet metal lip 23 is employed, as illustrated in FIG. 2, which is folded into V-shape, and is removably fastened to the bent-over edges 21 of the end plates 19 by self-tapping or other screws 24.

During assembly, the drum impeller, together with the spindle 9, is first inserted into the casing through the outflow aperture, whereupon the rubber-metal units 11 are screwed into the bores 15 of the spindle 9. The spiders have their central holes threaded over the screw bolts and are secured by means of the washer 17 and nut 16. The spiders 10 are thereupon fastened to the ingress rings 22 of the two end plates 19 by means of self-tapping or other screws 18.

As already stated, the disk-type motor comprises the rotatably mounted rotor 5 and the stationary stator 6. Both have sheet core recesses 25 and 26 of annularly wound iron sheet metal. The rotor has closed slots and a short-circuit winding cast into the same, with internally and externally located short-circuit rings 27 and 28. The sheet pack of the stator is secured in non-rotary manner on the spindle 9 by means of a hub 29. The sheet pack has open slot into which the winding 30 is inserted. A spacing washer 31 determines the air gap between the rotor and stator.

I claim:

1. Radial flow blower comprising a casing, a drum-type impeller in the casing, an electrically-driven driving motor mounted in the impeller, a stationary shaft secured at its ends to the casing, said motor having a stator secured on the shaft and the impeller being rotatably mounted on the shaft, said motor having a disk-shaped rotor connected to drive the impeller, and a carrying plate secured in the impeller to which a free side of the rotor is secured whereby the motor by its rotor will drive the carrying plate and the latter will rotate the impeller.

2. Radial flow blower according to claim 1, in which the casing is composed of a spirally bent sheet metal and end sides of sheet metal secured to the spirally bent sheet metal and each side having an opening therein to permit air to be sucked into the casing with the openings having a diameter smaller than the outer diameter of the casing, said openings each having an ingress ring and the spirally bent sheet metal having an outlet opening for the air extending the length of the blower and a sheet metal tongue removably secured to bent over edges of the sides to partially cover a lower part of the outlet opening in the spirally bent sheet metal.

3. Radial flow blower according to claim 1, in which a hub for the rotor and a centering rim are provided with the rim mounted on the hub of the rotor of the motor, for the support of the impeller with the aid of the carrying plate.

4. Radial flow blower according to claim 1, in which the rotor is mounted on the spindle within its axial width.

References Cited
UNITED STATES PATENTS

| | | | |
|---|---|---|---|
| 2,776,088 | 1/1957 | Wentling | 230—117 |
| 2,945,362 | 7/1960 | Gould et al. | 230—117 |
| 3,194,165 | 7/1965 | Sorlin | 103—87 |

ROBERT M. WALKER, *Primary Examiner.*